US010087378B2

(12) United States Patent
Oprins et al.

(10) Patent No.: US 10,087,378 B2
(45) Date of Patent: Oct. 2, 2018

(54) PROCESS FOR PRODUCING LPG AND BTX

(71) Applicant: SABIC Global Technologies B.V., Bergen op Zoom (NL)

(72) Inventors: Arno Johannes Maria Oprins, Maastricht (NL); Andrew Mark Ward, Stockton-on-Tees (GB); Andrew P. Davies, Cleveland (GB); Kae Shin Wong, Geleen (NL); Luis Aramburo, Geleen (NL); Maikel Van Iersel, Den Bosch (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/538,391

(22) PCT Filed: Dec. 15, 2015

(86) PCT No.: PCT/EP2015/079826
§ 371 (c)(1),
(2) Date: Jun. 21, 2017

(87) PCT Pub. No.: WO2016/102250
PCT Pub. Date: Jun. 30, 2016

(65) Prior Publication Data
US 2017/0342334 A1    Nov. 30, 2017

(30) Foreign Application Priority Data
Dec. 22, 2014    (EP) .................................... 14199592

(51) Int. Cl.
C10G 47/16    (2006.01)
C10G 65/10    (2006.01)
C10G 65/18    (2006.01)
B01D 3/14    (2006.01)
B01D 11/00    (2006.01)

(52) U.S. Cl.
CPC ............ *C10G 65/18* (2013.01); *B01D 3/143* (2013.01); *B01D 11/00* (2013.01); *C10G 47/16* (2013.01); *C10G 65/10* (2013.01); *C10G 2300/1037* (2013.01); *C10G 2400/18* (2013.01); *C10G 2400/20* (2013.01); *C10G 2400/26* (2013.01); *C10G 2400/28* (2013.01); *C10G 2400/30* (2013.01)

(58) Field of Classification Search
CPC ..... C10G 47/16; C10G 65/10; C10G 2400/28
See application file for complete search history.

(56) References Cited

U.S. PATENT DOCUMENTS

| 3,579,434 A | 5/1971 | Smith et al. |
| 3,617,486 A | 11/1971 | Lewis et al. |
| 3,718,575 A | 2/1973 | Watkins |
| 3,891,539 A | 6/1975 | Nelson et al. |
| 3,928,174 A | 12/1975 | Bonacci et al. |
| 3,944,481 A | 3/1976 | Wing et al. |
| 4,061,690 A | 12/1977 | Bernard et al. |
| 4,137,147 A * | 1/1979 | Franck ..................... B01J 29/20 208/61 |
| 4,140,621 A | 2/1979 | Franck et al. |
| 6,270,655 B1 | 8/2001 | Ganguli |
| 6,379,533 B1 | 4/2002 | Thakkar et al. |
| 2013/0267744 A1* | 10/2013 | Kim ...................... C07C 5/2737 585/251 |

FOREIGN PATENT DOCUMENTS

| DE | 1271868 B | 7/1968 |
| EP | 0023802 A1 | 2/1981 |
| GB | 1148967 A | 4/1969 |
| WO | 0244306 A1 | 6/2002 |
| WO | 2006124175 A2 | 11/2006 |
| WO | 2007055488 A1 | 5/2007 |
| WO | 2012071137 A1 | 5/2012 |

OTHER PUBLICATIONS

Alfke et al., "Oil Refining", Ullmann's Encyclopedia of Industrial Chemistry, 2007, 55 pages.
Baerlocher et al.; "Atlas of Zeolite Framework Types"; Elsevier, Fifth Revised Edition, 2001, pp. 1-308.
German Patent No. 1271868; Date of Publication: Jul. 4, 1968; English Translation, 5 pages.
International Search Report for International Application No. PCT/EP2015/079826; dated Feb. 19, 2016; 4 Pages.
IUPAC, Compendium of Chemical Terminology, Gold Book, 1997, 2nd edition, 1670 pages.
Kirk-Othmer Encyclopedia of Chemical Technology, "Molecular Sieves," Fifth Edition, vol. 16, (2006), pp. 811-853.
Scherzer et al., Hydrocracking Science and Technology (1996) pp. 13-14 and 174.
Written Opinion of the International Search Report for International Application No. PCT/EP2015/079826; dated Feb. 19, 2016; 9 Pages.

* cited by examiner

*Primary Examiner* — Randy Boyer
(74) *Attorney, Agent, or Firm* — Cantor Colburn LLP

(57) ABSTRACT

The invention relates to a process for producing LPG and BTX, comprising a) subjecting a mixed hydrocarbon stream to first hydrocracking in the presence of a first hydrocracking catalyst to produce a first hydrocracking product stream; b) separating the first hydrocracking product stream to provide at least a light hydrocarbon stream comprising at least C2 and C3 hydrocarbons, a middle hydrocarbon stream consisting of C4 and/or C5 hydrocarbons and a heavy hydrocarbon stream comprising at least C6+ hydrocarbons and c) subjecting the heavy hydrocarbon stream to second hydrocracking in the presence of a second hydrocracking catalyst to produce a second hydrocracking product stream comprising BTX, wherein the second hydrocracking is more severe than the first hydrocracking, d) wherein at least part of the middle hydrocarbon stream is subjected to C4 hydrocracking optimized for converting C4 hydrocarbons into C3 hydrocarbons in the presence of a C4 hydrocracking catalyst to produce a C4 hydrocracking product stream.

17 Claims, 3 Drawing Sheets

PROCESS FOR PRODUCING LPG AND BTX

CROSS REFERENCE TO RELATED APPLICATIONS

Figure 1:
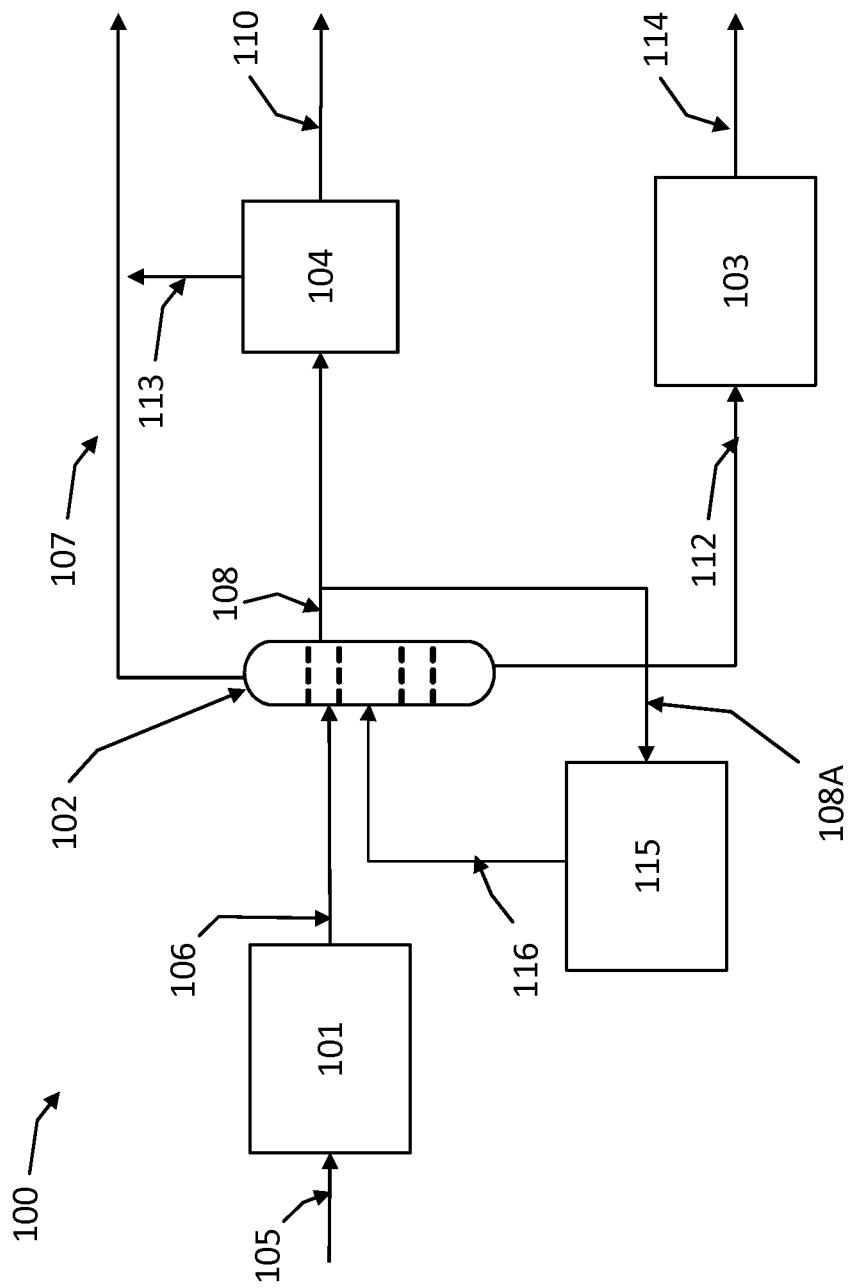

This application is a 371 of International Application No. PCT/EP2015/079826, filed Dec. 15, 2015, which claims priority to European Application No. 14199592.8, filed Dec. 22, 2014, both of which are incorporated herein by reference in their entirety.

The invention is directed to a process for producing LPG and BTX from a mixed hydrocarbon feedstream and a system for performing such process.

It is known that liquid petroleum gas (LPG) can be produced by converting naphtha or like materials by cracking, such as hydrocracking. Known processes to convert naphtha like material to LPG all suffer from either producing an LPG quality that has an undesirably high ratio of C4 hydrocarbons (hereinafter C# hydrocarbons are sometimes referred as C#, wherein # is a positive integer) to C3 hydrocarbons or an excessive production of methane. The undesirably high ratio of C4 hydrocarbons to C3 hydrocarbons results in an unbalance in the volumes of C3 and C4 derivatives/products obtained compared to petrochemical demand. The excessive production of methane is caused when the severity of the hydrocracking is increased to shift the products slate to ethane and propane as desired products.

In the prior art, such as in published patent applications WO2012/071137 and GB1148967, focus has been on maximizing C2. This results in high methane production as well. Alternatively, published US patents numbers U.S. Pat. No. 6,379,533, U.S. Pat. No. 3,718,575, U.S. Pat. No. 3,579,434 and others focus on LPG production including C4. This LPG does not constitute a desired feed for steam cracking for producing particularly useful products such as ethylene and propylene.

For application of LPG as fuel, the C3/C4 ratio is not very relevant, explaining the limited amount of development in this area. WO2012/071137 and GB1148967 describe recycling of C4+ material to maximize ethane production. To limit the size of the recycle stream, this implies a rather high severity in the (single) hydrocracking reactor provided, resulting in excessive methane production. Furthermore, WO2012/071137 and GB1148967 describe no equivalent of a hydrocracking process which results in benzene, toluene, xylene (BTX) product.

Among others, U.S. Pat. No. 6,379,533 and U.S. Pat. No. 3,718,575 describe a (integrated) multi-stage hydrocracking approach but solely aim at producing LPG with no control over the C3 to C4 ratio or the total amount of C4's being produced. As indicated above, this is a problem when not producing LPG fuels but petrochemicals derived from the C3 and C4 contained in the LPG.

With the demand for C4 derivatives possibly being smaller than for C3 derivatives, it would be desirable to control the amount of C4 produced. It is further desirable to control the composition of the C4 product (normal versus iso-butanes) as this will determine the ratio between the different C4 derivatives that will be produced.

There is a need in the industry for a process for producing LPG and BTX where the C2-C3 yield is increased relative to the C4 yield.

Accordingly, the invention provides a process for producing LPG and BTX, comprising
a) subjecting a mixed hydrocarbon stream to first hydrocracking in the presence of a first hydrocracking catalyst to produce a first hydrocracking product stream;
b) separating the first hydrocracking product stream to provide at least a light hydrocarbon stream comprising at least C2 and C3, a middle hydrocarbon stream consisting of C4 and/or C5 and a heavy hydrocarbon stream comprising at least C6+ and
c) subjecting the heavy hydrocarbon stream to second hydrocracking in the presence of a second hydrocracking catalyst to produce a second hydrocracking product stream comprising BTX, wherein the second hydrocracking is more severe than the first hydrocracking, wherein at least part of the middle hydrocarbon stream is subjected to C4 hydrocracking optimized for converting C4 hydrocarbons into C3 hydrocarbons in the presence of a C4 hydrocracking catalyst to produce a C4 hydrocracking product stream.

In another aspect, the invention provides a process for producing C2 and C3 hydrocarbons and BTX, comprising
a) subjecting a mixed hydrocarbon stream to first hydrocracking in the presence of a first hydrocracking catalyst to produce a first hydrocracking product stream;
b) separating the first hydrocracking product stream to provide at least
a light hydrocarbon stream comprising at least C2 and C3,
a middle hydrocarbon stream consisting of C4 and/or C5 and
a heavy hydrocarbon stream comprising at least C6+ and
c) subjecting the heavy hydrocarbon stream to second hydrocracking in the presence of a second hydrocracking catalyst to produce a second hydrocracking product stream comprising BTX, wherein the second hydrocracking is more severe than the first hydrocracking,
wherein at least part of the middle hydrocarbon stream is subjected to C4 hydrocracking optimized for converting C4 hydrocarbons into C3 hydrocarbons in the presence of a C4 hydrocracking catalyst to produce a C4 hydrocracking product stream.

According to the process of the invention, at least part of the C4 and/or C5 in the first hydrocracking product stream is subjected to C4 hydrocracking instead of being subjected to the second hydrocracking for producing BTX.

The second hydrocracking is more severe than the first cracking in the process of the present invention. A severe hydrocracking is herein meant that more cracking of the hydrocarbons occurs. The feature 'the second hydrocracking is more severe than the first hydrocracking' is herein understood to mean that the catalyst and/or the conditions (temperature, pressure and WHSV) of the second hydrocracking are chosen such that the stream produced by the second hydrocracking comprises a higher proportion of C1 than the stream produced by the first hydrocracking for a given hydrocarbon feed stream. For example, the second hydrocracking may be performed at a higher temperature and/or a lower WHSV and/or using a hydrocracking catalyst with a higher hydrocracking ability.

The second hydrocracking step is optimized for producing BTX preferably substantially free of BTX coboilers. Subjecting C4 and/or C5 to the second hydrocracking together with C6+ as in prior art processes results in a large amount of C1 due to more severe conditions required to produce on-spec BTX, particularly when larger amounts of C4 and/or C5 are present in the feed.

Instead of subjecting C4 and/or C5 to second hydrocracking together with C6+, at least part of C4 and/or C5 is subjected to C4 hydrocracking. The C4 hydrocracking is optimized for producing C3 and therefore the C4 hydrocracking product stream will contain a relatively high amount of C3 and a relatively low amount of C1. It is important to realize that C4 hydrocracking is applied to choose appropriate hydrocracking conditions to achieve significant C4 conversion as well as a relatively low methane make. If the C4/C5 is sent to the second hydrocracker, the methane make could actually be lower, however, the conversion of C4 would also be low. If significant conversion (i.e. reduced C4 and/or C5 production) is desired, the severity of the second hydrocracking has to be increased, which increases the relative methane make.

U.S. Pat. No. 3,928,174 describes processing of reformate product of catalyst reforming. In U.S. Pat. No. 3,928,174, C5+ reformate is separated to recover toluene enriched C6+ reformate material from the bottom of the stabilizer (FIG. 1, (8), (12)) and C5 and lower boiling components from the top of the stabilizer (10). The C6+ from the bottom is separated into an overhead fraction comprising some toluene and lower boiling components (16) and a bottom fraction of C7+ toluene-xylene rich fraction (18). The overhead fraction and the bottom fraction are each passed to a catalyst zone. In U.S. Pat. No. 3,928,174, C5 and lower boiling components are separated out as a whole and no separation is made to separate C3– and C4+. The overhead fraction (16) is formed from a portion which does not contain C5– (12), and therefore its overhead fraction (16) does not comprise C4 and/or C5. Accordingly, U.S. Pat. No. 3,928,174 at least does not disclose providing a middle hydrocarbon as required in step b) of the process of the invention.

Unlike the prior art processes, the process according to the invention controls the composition of the LPG. The prior art processes produce LPG without controlling its composition, whereas the process according to the invention produces increased amounts of C2-C3 hydrocarbons and decreased amounts of C4 hydrocarbons. Further the C1 production is limited.

In a process where a mixed hydrocarbon feedstream is subjected to a first hydrocracking and (a part of) the first hydrocracking product stream is subjected to a more severe second hydrocracking, the compositions of the second hydrocracking product stream are influenced by the conditions of the second hydrocracking as well as the feed for the second hydrocracking. The present inventors have realized that: when C4/C5 is subjected to the second hydrocracking together with C6+, severe conditions lead to large amounts of C2-C3 in combination with a large amount of C1 (conditions for conversion of C4/C5 into C2-C3 would result in a large amount of C6+ being converted to C1) and less severe conditions lead to small amount of C2-C3 in combination with a small amount of C1. The present inventors have realized that desired compositions can be obtained by treating C4/C5 separately from C6+ hydrocarbons. The composition of the obtained LPG can be controlled (increased amounts of C2-C3 and decreased amounts of C4) while limiting the amount of C1 by separating out C4/C5 and subjecting it to the C4 hydrocracking. Only the heavy hydrocarbon stream is sent to the second hydrocracking, which can be converted to desired composition without producing a large amount of C1.

The C4 hydrocracking product stream may be combined with the light hydrocarbon stream or be recycled back to the first hydrocracking of step a).

Preferably, however, the C4 hydrocracking product stream is recycled back to the separation of step b). The C2/C3 in the C4 hydrocracking product stream is recovered as the light hydrocarbon stream. The unconverted C4/C5 in the C4 hydrocracking product stream is again separated as the middle hydrocarbon stream and subjected to the C4 hydrocracking. The C4 hydrocracking results in a good combination of a high C4 conversion rate and a low methane make. Compared to a process in which a mixed hydrocarbon feedstream is directly subjected to a second hydrocracking or a process in which all of the product stream from the first hydrocracking is subjected to the second hydrocracking, C4 hydrocracking and recycling of the C4 hydrocracking product stream increases the proportion of the more valuable C2-C3 and decreases the proportion of the less valuable C1, C4 and C5.

Hydrocracking

As used herein, the term "hydrocracking unit" or "hydrocracker" relates to a unit in which a hydrocracking process is performed i.e. a catalytic cracking process assisted by the presence of an elevated partial pressure of hydrogen; see e.g. Alfke et al. (2007) loc.cit. The products of this process are saturated hydrocarbons and, depending on the reaction conditions such as temperature, pressure and space velocity and catalyst activity, naphthenic (cycloalkane) hydrocarbons and aromatic hydrocarbons including BTX. Hydrocracking reactions generally proceed through a bifunctional mechanism which requires an acid function, which provides for the cracking and isomerization and which provides breaking and/or rearrangement of the carbon-carbon bonds comprised in the hydrocarbon compounds comprised in the feed, and a hydrogenation function. Many catalysts used for the hydrocracking process are formed by combining various transition metals, or metal sulfides with the solid support such as alumina, silica, alumina-silica, magnesia and zeolites. The catalysts may be a physical mixture of two catalysts with different metals or supports. Hydrocracking reactions can also proceed via the so-called mono-molecular or Haag-Dessau cracking mechanism which only requires the presence of acid sites. This is usually important at higher temperatures (i.e. >500° C.) but can also play a role at lower temperatures.

Second Hydrocracking

The second hydrocracking process is a hydrocracking process suitable for converting a complex hydrocarbon feed that is relatively rich in aromatic hydrocarbon compounds with one ring to LPG and BTX, wherein said process is optimized to keep the aromatic ring intact of the aromatics comprised in the feedstream, but to remove most of the longer side-chains from said aromatic ring. A significant portion of 6-ring naphthenes can be converted to aromatics. Substantially all co-boilers of aromatic C6+ hydrocarbons are hydrocracked. The second hydrocracking product stream is hence preferably substantially free from non-aromatic C6+ hydrocarbons. As meant herein, the term "stream substantially free from non-aromatic C6+ hydrocarbons" means that said stream comprises less than 1 wt-% non-aromatic C6+ hydrocarbons, preferably less than 0.7 wt-% non-aromatic C6+ hydrocarbons, more preferably less than 0.6 wt-% non-aromatic C6+ hydrocarbons and most preferably less than 0.5 wt-% non-aromatic C6+ hydrocarbons.

In the second hydrocracking in the process according to the invention, the heavy hydrocarbon stream is contacted in the presence of hydrogen with a second hydrocracking catalyst.

Catalysts having hydrocracking activity are described on pages 13-14 and 174 of Hydrocracking Science and Technology (1996) Ed. Julius Scherzer, A. J. Gruia, Pub. Taylor and Francis. Hydrocracking reactions generally proceed through a bifunctional mechanism which requires a relatively strong acid function, which provides for the cracking and isomerization and a metal function, which provides for the olefin hydrogenation. Many catalysts used for the hydrocracking process are formed by composting various transition metals with the solid support such as alumina, silica, alumina-silica, magnesia and zeolites.

In preferred embodiments of the invention, the second hydrocracking catalyst is a hydrocracking catalyst comprising 0.01-1 wt-% hydrogenation metal in relation to the total catalyst weight and a zeolite having a pore size of 5-8 Å and a silica ($SiO_2$) to alumina ($Al_2O_3$) molar ratio of 5-200.

The process conditions comprise a temperature of 300-580° C., a pressure of 300-5000 kPa gauge and a Weight Hourly Space Velocity of 0.1-15 $h^{-1}$.

Preferably, the catalyst is a hydrocracking catalyst comprising 0.01-1 wt-% hydrogenation metal in relation to the total catalyst weight and a zeolite having a pore size of 5-8 Å and a silica ($SiO_2$) to alumina ($Al_2O_3$) molar ratio of 5-200 and the process conditions comprise a temperature of 425-580° C., a pressure of 300-5000 kPa gauge and a Weight Hourly Space Velocity of 0.1-15 $h^{-1}$. In these embodiments, the obtained second hydrocracking product stream is advantageously substantially free from non-aromatic C6+ hydrocarbons due to the catalyst and the conditions employed. Hence, chemical grade BTX can easily be separated from the hydrocracking product stream.

Preferably, the second hydrocracking is performed at a temperature of 425-580° C., more preferably 450-550° C.

Preferably, the second hydrocracking is performed at a pressure of 300-5000 kPa gauge, more preferably at a pressure of 1200-4000 kPa gauge. By increasing reactor pressure, conversion of C6+ non-aromatics can be increased, but also increases the yield of methane and the hydrogenation of aromatic rings to cyclohexane species which can be cracked to LPG species. This results in a reduction in aromatic yield as the pressure is increased and, as some cyclohexane and its isomer methylcyclopentane, are not fully hydrocracked, there is an optimum in the purity of the resultant benzene at a pressure of 1200-1600 kPa.

Preferably, the second hydrocracking step is performed at a Weight Hourly Space Velocity (WHSV) of 0.1-15 $h^{-1}$, more preferably at a Weight Hourly Space Velocity of 1-6 $h^{-1}$. When the space velocity is too high, not all BTX co-boiling paraffin components are hydrocracked, so it will not be possible to achieve BTX specification by simple distillation of the reactor product. At too low space velocity the yield of methane rises at the expense of propane and butane. By selecting the optimal Weight Hourly Space Velocity, it was surprisingly found that sufficiently complete reaction of the benzene co-boilers is achieved to produce on spec BTX without the need for a liquid recycle.

Accordingly, preferred conditions for the second hydrocracking step thus include a temperature of 425-580° C., a pressure of 300-5000 kPa gauge and a Weight Hourly Space Velocity of 0.1-15 $h^{-1}$. More preferred hydrocracking conditions include a temperature of 450-550° C., a pressure of 1200-4000 kPa gauge and a Weight Hourly Space Velocity of 1-6 $h^{-1}$.

Preferably, the molar ratio of hydrogen to hydrocarbon species ($H_2$/HC molar ratio) is 1:1-4:1, more preferably 1:1-2:1.

Hydrocracking catalysts that are particularly suitable for the process of the present invention comprise a molecular sieve, preferably a zeolite, having a pore size of 5-8 Å.

Zeolites are well-known molecular sieves having a well-defined pore size. As used herein, the term "zeolite" or "aluminosilicate zeolite" relates to an aluminosilicate molecular sieve. An overview of their characteristics is for example provided by the chapter on Molecular Sieves in Kirk-Othmer Encyclopedia of Chemical Technology, Volume 16, p 811-853; in Atlas of Zeolite Framework Types, 5th edition, (Elsevier, 2001). Preferably, the hydrocracking catalyst comprises a medium pore size aluminosilicate zeolite or a large pore size aluminosilicate zeolite. Suitable zeolites include, but are not limited to, ZSM-5, MCM-22, ZSM-11, beta zeolite, EU-1 zeolite, zeolite Y, faujastite, ferrierite and mordenite. The term "medium pore zeolite" is commonly used in the field of zeolite catalysts. Accordingly, a medium pore size zeolite is a zeolite having a pore size of about 5-6 Å. Suitable medium pore size zeolites are 10-ring zeolites, i.e. the pore is formed by a ring consisting of 10 $SiO_4$ tetrahedra. Suitable large pore size zeolites have a pore size of about 6-8 Å and are of the 12-ring structure type. Zeolites of the 8-ring structure type are called small pore size zeolites. In the above cited Atlas of Zeolite Framework Types various zeolites are listed based on ring structure. Most preferably the zeolite is ZSM-5 zeolite, which is a well-known zeolite having MFI structure.

Preferably, the silica to alimuna ratio of the ZSM-5 zeolite is in the range of 20-200, more preferably in the range of 30-100.

The zeolite is in the hydrogen form: i.e. having at least a portion of the original cations associated therewith replaced by hydrogen. Methods to convert an aluminosilicate zeolite to the hydrogen form are well known in the art. A first method involves direct ion exchange employing an acid and/or salt. A second method involves base-exchange using ammonium salts followed by calcination.

Furthermore, the catalyst composition comprises a sufficient amount of hydrogenation metal to ensure that the catalyst has a relatively strong hydrogenation activity. Hydrogenation metals are well known in the art of petrochemical catalysts.

The catalyst composition preferably comprises 0.01-1 wt-% hydrogenation metal, more preferably 0.01-0.7 wt-%, most preferably 0.01-0.5 wt-% hydrogenation metal, more preferably 0.01-0.3 wt-%. The catalyst composition may more preferably comprise 0.01-0.1 wt-% or 0.02-0.09 wt-% hydrogenation metal. In the context of the present invention, the term "wt %" when relating to the metal content as comprised in a catalyst composition relates to the wt % (or "wt-%") of said metal in relation to the weight of the total catalyst, including catalyst binders, fillers, diluents and the like. Preferably, the hydrogenation metal is at least one element selected from Group 10 of the Periodic Table of Elements. The preferred Group 10 element is platinum (Pt). Accordingly, the hydrocracking catalyst used in the process of the present invention comprises a zeolite having a pore size of 5-8 Å, a silica ($SiO_2$) to alumina ($Al_2O_3$) molar ratio of 5-200 and 0.01-1 wt-% platinum (in relation to the total catalyst).

The hydrocracking catalyst composition may further comprise a binder. Alumina ($Al_2O_3$) is a preferred binder. The catalyst composition of the present invention preferably comprises at least 10 wt-%, most preferably at least 20 wt-% binder and preferably comprises up to 40 wt-% binder. In some embodiments, the hydrogenation metal is deposited on the binder, which preferably is $Al_2O_3$.

According to some embodiments of the invention, the hydrocracking catalyst is a mixture of the hydrogenation metal on a support of an amorphous alumina and the zeolite.

According to other embodiments of the invention, the hydrocracking catalyst comprises the hydrogenation metal on a support of the zeolite. In this case, the hydrogenation metal and the zeolite giving cracking functions are in closer proximity to one another which translates into a shorter diffusion length between the two sites. This allows high space velocity, which translates into smaller reactor volumes and thus lower CAPEX. Accordingly, in some preferred embodiments, the hydrocracking catalyst is the hydrogenation metal on a support of the zeolite and the second hydrocracking is performed at a Weight Hourly Space Velocity of 10-15 ft'.

The hydrocracking catalyst may be free of further metals or may comprise further metals. In case the hydrocracking catalyst comprises a further element that reduces the hydrogenation activity of the catalyst, such as tin, lead or bismuth, lower temperatures may be selected for the second hydrocracking step; see e.g. WO 02/44306 A1 and WO 2007/055488.

In case the reaction temperature is too high, the yield of LPG's (especially propane and butanes) declines and the yield of methane rises. As the catalyst activity may decline over the lifetime of the catalyst, it is advantageous to increase the reactor temperature gradually over the life time of the catalyst to maintain the hydrocracking conversion rate. This means that the optimum temperature at the start of an operating cycle preferably is at the lower end of the hydrocracking temperature range. The optimum reactor temperature will rise as the catalyst deactivates so that at the end of a cycle (shortly before the catalyst is replaced or regenerated) the temperature preferably is selected at the higher end of the hydrocracking temperature range.

The second hydrocracking step is performed in the presence of an excess amount of hydrogen in the reaction mixture. This means that a more than stoichiometric amount of hydrogen is present in the reaction mixture that is subjected to hydrocracking. Preferably, the molar ratio of hydrogen to hydrocarbon species ($H_2$/HC molar ratio) in the reactor feed is between 1:1 and 4:1, preferably between 1:1 and 3:1 and most preferably between 1:1 and 2:1. A higher benzene purity in the product stream can be obtained by selecting a relatively low $H_2$/HC molar ratio. In this context the term "hydrocarbon species" means all hydrocarbon molecules present in the reactor feed such as benzene, toluene, hexane, cyclohexane etc. It is necessary to know the composition of the feed to then calculate the average molecular weight of this stream to be able to calculate the correct hydrogen feed rate. The excess amount of hydrogen in the reaction mixture suppresses the coke formation which is believed to lead to catalyst deactivation.

First Hydrocracking

The first hydrocracking is a hydrocracking process suitable for converting a complex hydrocarbon feed that is relatively rich in naphthenic and paraffinic hydrocarbon compounds to a product stream rich in LPG and aromatic hydrocarbons. Such hydrocracking is described e.g. in U.S. Pat. No. 3,718,575, GB1148967 and U.S. Pat. No. 6,379,533. Preferably, the amount of the LPG in the first hydrocracking product stream is at least 50 wt %, more preferably at least 60 wt %, more preferably at least 70 wt % and more preferably at least 80 wt % of the total first hydrocracking product stream. Preferably, the amount of the C2-C3 in the first hydrocracking product stream is at least 40 wt %, more preferably at least 50 wt %, more preferably at least 60 wt % and more preferably at least 65 wt % of the total first hydrocracking product stream. Preferably, the amount of the aromatic hydrocarbons in the first hydrocracking product stream is 3-20 wt %, e.g. 5-15 wt %. As described elsewhere, the first hydrocracking is relatively mild and does not result in a high amount of methane. Preferably, the amount of methane in the first hydrocracking product stream is at most 5 wt %, more preferably at most 3 wt %.

The first hydrocracking catalyst may be a conventional catalyst generally used for hydrocracking of a mixture of hydrocarbons. For example, the first hydrocracking catalyst may be a catalyst containing one metal or two or more associated metals of group VIII, VI B or VII B of the periodic classification of elements, deposited on a carrier of sufficient surface and volume, such as, for example, alumina, silica, alumina-silica, zeolite, etc; when using a zeolite, the metal (s) may be introduced by appropriate exchange. The metals are, for example, palladium, iridium, tungsten, rhenium, cobalt, nickel, etc. used alone or as mixtures. The metal concentrations may be preferably 0.1 to 10 wt %.

Preferably, the conditions for the first hydrocracking include a temperature of 250-580° C., more preferably 300-450° C., a pressure of 300-5000 kPa gauge, more preferably 1200-4000 kPa gauge and a WHSV of 0.1-15 h$^{-1}$, more preferably 1-6 h$^{-1}$. Preferably, the molar ratio of hydrogen to hydrocarbon species ($H_2$/HC molar ratio) is 1:1-4:1, more preferably 1:1-2:1.

The first hydrocracking may be optimized to keep the aromatic ring intact of the aromatics comprised in the feedstream, but to remove most of the longer side-chains from said aromatic ring. In such a case, the process conditions to be employed for the first hydrocracking step are similar to the process conditions to be used in the second hydrocracking step as described herein above: a temperature of 300-580° C., a pressure of 300-5000 kPa gauge and a Weight Hourly Space Velocity of 0.1-15 h$^{-1}$. In this case, the suitable catalyst used for the first hydrocracking step is the same as the ones described for the second hydrocracking step. For example, the catalyst for the first hydrocracking step is a hydrocracking catalyst comprising 0.01-1 wt-% hydrogenation metal in relation to the total catalyst weight and a zeolite having a pore size of 5-8 Å and a silica ($SiO_2$) to alumina ($Al_2O_3$) molar ratio of 5-200.

The first hydrocracking is however less severe than the second hydrocracking, as described above. Preferably, the first hydrocracking conditions comprise a lower process temperature than the second hydrocracking step. Accordingly, the first hydrocracking step conditions preferably comprise a temperature of 300-450° C., more preferably 300-425° C., more preferably 300-400° C.

Definitions

The term "alkane" or "alkanes" is used herein having its established meaning and accordingly describes acyclic branched or unbranched hydrocarbons having the general formula $C_nH_{2n+2}$, and therefore consisting entirely of hydrogen atoms and saturated carbon atoms; see e.g. IUPAC. Compendium of Chemical Terminology, 2nd ed. (1997). The term "alkanes" accordingly describes unbranched alkanes ("normal-paraffins" or "n-paraffins" or "n-alkanes") and branched alkanes ("iso-paraffins" or "iso-alkanes") but excludes naphthenes (cycloalkanes).

The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons.

The terms "naphthenic hydrocarbons" or "naphthenes" or "cycloalkanes" is used herein having its established meaning and accordingly describes saturated cyclic hydrocarbons.

The term "olefin" is used herein having its well-established meaning. Accordingly, olefin relates to an unsaturated hydrocarbon compound containing at least one carbon-carbon double bond. Preferably, the term "olefins" relates to a mixture comprising two or more of ethylene, propylene, butadiene, butylene-1, isobutylene, isoprene and cyclopentadiene.

The term "LPG" as used herein refers to the well-established acronym for the term "liquefied petroleum gas". LPG as used herein generally consists of a blend of C2-C4 hydrocarbons i.e. a mixture of C2, C3, and C4 hydrocarbons.

One of the petrochemical products produced in the process of the present invention is BTX. The term "BTX" as used herein relates to a mixture of benzene, toluene and xylenes. Preferably, the product produced in the process of the present invention comprises further useful aromatic hydrocarbons such as ethylbenzene. Accordingly, the present invention preferably provides a process for producing a mixture of benzene, toluene, xylenes and ethylbenzene ("BTXE"). The product as produced may be a physical mixture of the different aromatic hydrocarbons or may be directly subjected to further separation, e.g. by distillation, to provide different purified product streams. Such purified product stream may include a benzene product stream, a toluene product stream, a xylene product stream and/or an ethylbenzene product stream.

As used herein, the term "C# hydrocarbons", wherein "#" is a positive integer, is meant to describe all hydrocarbons having # carbon atoms. C# hydrocarbons are sometimes indicated as just "C#". Moreover, the term "C#+ hydrocarbons" is meant to describe all hydrocarbon molecules having # or more carbon atoms. Accordingly, the term "C5+ hydrocarbons" is meant to describe a mixture of hydrocarbons having 5 or more carbon atoms. The term "C5+ alkanes" accordingly relates to alkanes having 5 or more carbon atoms.

Step a)

A mixed hydrocarbon stream is subjected to the first hydrocracking in step a). In some embodiments, part of the middle hydrocarbon stream, especially C5, is recycled back to be subjected to the first hydrocracking of step a), as described later. The mixed hydrocarbon stream and the recycled middle hydrocarbon stream may be combined before being fed to the first hydrocracking unit or the mixed hydrocarbon stream and the recycled middle hydrocarbon stream may be fed to the first hydrocracking unit at different inlets. It will be appreciated that, in the cases where further hydrocarbon stream(s) are recycled to step a), the further recycled stream(s) may be combined with the mixed hydrocarbon stream and/or the recycled middle hydrocarbon stream before being fed to the first hydrocracking reactor, or may be fed to the first hydrocracking reactor at different inlets.

Mixed Hydrocarbon Stream

The mixed hydrocarbon stream comprises C5+ hydrocarbons. Typically, the mixed hydrocarbon feedstream is a naphtha or a naphtha-like product, preferably having a boiling point range of 20-200° C. Suitable hydrocracking feed streams include, but are not limited to first stage or multi-stage hydro-treated pyrolysis gasoline, straight run naphtha, hydrocracked gasoline, light coker naphtha and coke oven light oil, FCC gasoline, reformate, FT (Fischer-Tropsch) or synthetic naphtha, or mixtures thereof.

First Hydrocracking Product Stream

By step a), the proportion of LPG (C2-C4 hydrocarbons) is increased compared to the feed stream. The first hydrocracking product stream obtained by step a) comprises H2 and C1, LPG (C2-C4 hydrocarbons), C5 and C6+ hydrocarbons. The C4 hydrocarbons includes normal C4 hydrocarbons (herein sometimes referred as nC4 hydrocarbons) such as n-butane and iso C4 hydrocarbons (herein sometimes referred as iC4 hydrocarbons) such as isobutane.

Step b)

According to the invention, the first hydrocracking product stream comprising a range of hydrocarbons is separated to provide at least a light hydrocarbon stream, a middle hydrocarbon stream and a heavy hydrocarbon stream. The separation may be performed using any known technology for the separation of a mixed hydrocarbon stream, for example, gas-liquid separation, distillation or solvent extraction. The separation may be performed in one unit or multiple units.

H2 may be separated from the first hydrocracking product stream before the separation between the light, middle and heavy hydrocarbon streams. It is also possible to separate out C1 as well as H2 from the first hydrocracking product stream before the separation between the light, middle and heavy hydrocarbon streams.

According to the invention, the first hydrocracking product stream as well as the C4 hydrocracking product stream is subjected to the separation in step b). The mixed hydrocarbon stream and the C4 hydrocracking product stream may be combined before the separation into the light, middle and heavy hydrocarbon stream. The mixed hydrocarbon stream and the C4 hydrocracking product stream may also be separated in different separating units.

More than One Middle Hydrocarbon Stream

In some embodiments, the entire middle hydrocarbon stream is subjected to the C4 hydrocracking. In other embodiments, part of the middle hydrocarbon stream is subjected to the C4 hydrocracking and part of the middle hydrocarbon stream is used as the final product or subjected to suitable further steps depending on needs. It is further possible that part of the middle hydrocarbon stream is recycled back to the first hydrocracking of step a). It will be appreciated that a separation of the middle hydrocarbon stream takes place in these cases. The separation of the middle hydrocarbon stream may take place in the same separator as the separator for making the light hydrocarbon stream and the heavy hydrocarbon stream. Alternatively, the separation of the middle hydrocarbon stream is performed in a separate separator.

The middle hydrocarbon stream can be provided by step b) in the form of one stream or a plurality of streams. Accordingly, in some embodiments, the middle hydrocarbon stream is provided by step b) as a first middle hydrocarbon stream and a second middle hydrocarbon stream, wherein the boiling point range of the second middle hydrocarbon stream is higher than the boiling point range of the first middle hydrocarbon stream. For example, the first middle hydrocarbon stream may comprise iC4 and the second middle hydrocarbon stream may comprise nC4. Preferably, at least part of the second middle hydrocarbon stream is recycled back to the first hydrocracking in step a).

Various Separations

The separation between the light hydrocarbon stream and the middle hydrocarbon stream may be performed at various points, for example between C3 and iC4, between iC4 and nC4 and between nC4 and C5.

The separation between the middle hydrocarbon stream and the heavy hydrocarbon stream may be performed at various points, for example between iC4 hydrocarbon and nC4 hydrocarbon, between nC4 and C5 and between C5 and C6.

The light hydrocarbon stream comprises at least C2 and C3. The light hydrocarbon stream may be used as the final product or subjected to suitable further steps, optionally after further separation(s). For example, in the cases where the light hydrocarbon stream comprises C4, the C4 may be separated out from the light hydrocarbon stream to be subjected to suitable further steps. Due to the separation point between the light hydrocarbon stream and the middle hydrocarbon stream, the light hydrocarbon stream comprises little or no amount of C5+ hydrocarbons. Preferably, the light hydrocarbon stream comprises at most 10 wt % more preferably at most 5 wt %, and most preferably at most 3 wt % of C5+ hydrocarbons.

The middle hydrocarbon stream comprises C4 and/or C5. Part or all of the middle hydrocarbon stream is subjected to the C4 hydrocracking, optionally after further separation(s). Part of the middle hydrocarbon stream may be used as the final product or subjected to suitable further steps, optionally after further separation(s). Part of the middle hydrocarbon stream may be recycled back to the first hydrocracking. Preferably, the middle hydrocarbon stream or the part of the middle hydrocarbon stream subjected to C4 hydrocracking substantially consists of C4 and C5 hydrocarbons. Preferably, the amount of the C4 and C5 hydrocarbons in the middle hydrocarbon stream or the part of the middle hydrocarbon stream subjected to C4 hydrocracking is at least 70 wt %, more preferably 80 wt %, even more preferably 90 wt % . . . . Preferably, the amount of the C3-hydrocarbons in the middle hydrocarbon stream or the part of the middle hydrocarbon stream subjected to C4 hydrocracking is at most 10 wt %, more preferably 5 wt %. Preferably, the amount of the C6+ hydrocarbons in the middle hydrocarbon stream or the part of the middle hydrocarbon stream subjected to C4 hydrocracking is at most 10 wt %, more preferably 5 wt %.

The heavy hydrocarbon stream comprises at least C6+. The heavy hydrocarbon stream is subjected to the second hydrocracking. Due to the separation point between the middle hydrocarbon stream and the heavy hydrocarbon stream, the heavy hydrocarbon stream comprises little or no amount of C4-hydrocarbons. Preferably, the heavy hydrocarbon stream comprises at most 5 wt %, more preferably at most 2 wt %, most preferably at most 1 wt % . . . of C4-hydrocarbons.

C3/iC4 and iC4/C5

In some embodiments, the separation between the light hydrocarbon stream and the middle hydrocarbon stream is performed to separate between C3 and iC4 and the separation between the middle hydrocarbon stream and the heavy hydrocarbon stream is performed to separate iC4 and nC4. In this case, the light hydrocarbon stream consists of C3–, the middle hydrocarbon stream consists of iC4 and the heavy hydrocarbon stream consists of nC4 and C5+. When the middle hydrocarbon stream consists of iC4, part of the iC4 is subjected to the C4 hydrocracking. The remainder of the iC4 may be used as the final product or subjected to suitable further steps depending on needs.

C3/iC4 and nC4/C5

In some embodiments, the separation between the light hydrocarbon stream and the middle hydrocarbon stream is performed to separate between C3 and iC4 and the separation between the middle hydrocarbon stream and the heavy hydrocarbon stream is performed to separate nC4 and C5. In this case, the light hydrocarbon stream consists of C3–, the middle hydrocarbon stream consists of C4 (iC4 and nC4) and the heavy hydrocarbon stream consists of C5+. When the middle hydrocarbon stream consists of C4, part of the C4 is subjected to the C4 hydrocracking. The remainder of the C4 may be used as the final product or subjected to suitable further steps depending on needs. For example, the part of the C4 subjected to the C4 hydrocracking may be nC4 and the remainder of the C4 which may be used as the final product or subjected to suitable further steps may be iC4.

C3/iC4 and C5/C6

In some embodiments, the separation between the light hydrocarbon stream and the middle hydrocarbon stream is performed to separate between C3 and iC4 and the separation between the middle hydrocarbon stream and the heavy hydrocarbon stream is performed to separate C5 and C6. In this case, the light hydrocarbon stream consists of C3–, the middle hydrocarbon stream consists of C4 (iC4 and nC4) and C5 and the heavy hydrocarbon stream consists of C6+. When the middle hydrocarbon stream consists of C4 and C5, part of the C4 is subjected to the C4 hydrocracking. The remainder of the C4 may be used as the final product or subjected to suitable further steps depending on needs. For example, the part of the C4 subjected to the C4 hydrocracking may be nC4 and the remainder of the C4 which may be used as the final product or subjected to suitable further steps may be iC4. C5 may be subjected to the C4 hydrocracking, but more preferably, part or all of the C5 is recycled back to the first hydrocracking in step a).

iC4/nC4 and nC4/C5

In some embodiments, the separation between the light hydrocarbon stream and the middle hydrocarbon stream is performed to separate between iC4 and nC4 and the separation between the middle hydrocarbon stream and the heavy hydrocarbon stream is performed to separate nC4 and C5. In this case, the light hydrocarbon stream consists of C3– and iC4, the middle hydrocarbon stream consists of nC4 and the heavy hydrocarbon stream consists of C5+. When the middle hydrocarbon stream consists of nC4, part of the nC4 is subjected to the C4 hydrocracking. The remainder of the nC4 may be used as the final product or subjected to suitable further steps depending on needs.

iC4/nC4 and C5/C6

In some embodiments, the separation between the light hydrocarbon stream and the middle hydrocarbon stream is performed to separate between iC4 and nC4 and the separation between the middle hydrocarbon stream and the heavy hydrocarbon stream is performed to separate C5 and C6. In this case, the light hydrocarbon stream consists of C3– and iC4, the middle hydrocarbon stream consists of nC4 and C5 and the heavy hydrocarbon stream consists of C6+. When the middle hydrocarbon stream consists of nC4 and C5, part of the nC4 is subjected to the C4 hydrocracking and the remainder of the nC4 is used as the final product or subjected to suitable further steps depending on needs. C5 may be subjected to the C4 hydrocracking, but more preferably, part or all of the C5 is recycled back to the first hydrocracking in step a).

nC4/C5 and C5/C6

In some embodiments, the separation between the light hydrocarbon stream and the middle hydrocarbon stream is performed to separate between nC4 and C5 and the separation between the middle hydrocarbon stream and the heavy hydrocarbon stream is performed to separate C5 and C6. In this case, the light hydrocarbon stream consists of C3–, iC4 and nC4, the middle hydrocarbon stream consists of C5 and the heavy hydrocarbon stream consists of C6+. When the middle hydrocarbon stream consists of C5, part or all of the C5 is subjected to the C4 hydrocracking. Preferably, part of the C5 is recycled back to the first hydrocracking in step a).

Subjecting C5 to the second hydrocracking is beneficial for the good combination of a good selectivity (low methane make) and a sufficient conversion rate.

In other cases where C5 is not subjected to second hydrocracking, all of the C5 in the middle hydrocarbon stream is preferably either recycled back to the first hydrocracking or subjected to the C4 hydrocracking. Preferably, the C5 is recycled back to the first hydrocrackingfor the high selectivity. It may also reduce the risk of coking of the C4 hydrocracking catalyst. Processing the C5 in the C4 hydrocracker (or even in a separate dedicated C5 hydrocracker) might be preferred when higher conversion is needed. When only part of the C5 is recycled back or subjected to the C4 hydrocracking, the remainder of the C5 may be used as the final product or subjected to suitable further steps depending on needs.

Accordingly, in some preferred embodiments, step b) involves separating between the C4 of the middle hydrocarbon stream and the C5 of the middle hydrocarbon stream and the C4 of the middle hydrocarbon stream is subjected to the C4 hydrocracking and the C5 of the middle hydrocarbon stream is recycled back to the first hydrocracking in step a) C4 not subjected to C4 hydrocracking C4 of the middle hydrocarbon stream not subjected to the C4 hydrocracking may be used as the final product or subjected to suitable further steps depending on needs. The further steps may preferably be selected from the group consisting of isomerization, butane dehydrogenation (non-oxidative and oxidative), reaction with methanol and reaction with ethanol and combinations thereof. Specific examples of said combinations thereof include isomerization followed by dehydrogenation.

N-butane in the non-recycled C4 may e.g. be subjected to isomerization to obtain i-butane or to dehydrogenation to obtain n-butene and butadiene.

Iso-butane in the non-recycled C4 and i-butane obtained by isomerization of n-butane may e.g. be subjected to dehydrogenation to obtain iso-butene, reacted with methanol to obtain methyl tert-butyl ether (MTBE) or reacted with ethanol to obtain ethyl tert-butyl ether (ETBE).

Non-recycled C4 from the middle hydrocarbon stream may also be subjected to a cracking process for converting C4 to smaller hydrocarbons such as C2 and C3.

In some embodiments, the product obtained by the further steps may be combined with the light hydrocarbon stream, optionally after separation of the components in said product.

Step c)

The heavy hydrocarbon stream obtained by step b) is subjected to second hydrocracking as described above to produce a second hydrocracking product stream comprising BTX.

The second hydrocracking product stream substantially consists of H2, C1-4 and BTX. The conditions of the second hydrocracking can be adjusted such that the second hydrocracking product stream comprises substantially no co-boilers of BTX.

The C4− may be separated from the second hydrocracking product stream to be recycled back to the separation of step b).

Alternatively, the C4− may be separated from the second hydrocracking product stream to be combined with the light hydrocarbon stream.

Alternatively, the C4− may be separated from the second hydrocracking product stream to be recycled back to the first hydrocracking of step a).

Alternatively, the C4− may be separated from the second hydrocracking product stream to be recycled back to the C4 hydrocracking.

C4 Hydrocracking

At least part of the middle hydrocarbon stream is subjected to C4 hydrocracking. The C4 hydrocarbon product stream is preferably subsequently recycled back to the separation of step b).

Alternatively, the C4 hydrocracking product stream may be combined with the light hydrocarbon stream.

Alternatively, the C4 hydrocracking product stream may be recycled back to the first hydrocracking of step a).

Alternatively, the C4 may be separated from the C4 hydrocracking product stream to be recycled back to the C4 hydrocracking.

As used herein, the term "C4 hydrocracking" refers to a hydrocracking process optimized for converting C4 hydrocarbons to C3 hydrocarbons. Such a process is known from, for example U.S. Pat. No. 4,061,690. Due to the high selectivity towards C3, conversion of C3 already present in the feed would not be significant. The degree of conversion of C2 and C1 would be even less. Hence, the C4 hydrocracking product stream will contain a high ratio of C3 to C4.

Since the C4 hydrocracking may result in the loss of valuable aromatics, the feed stream is preferably rich in C4.

Preferably, the part of the middle hydrocarbon stream subjected to C4 hydrocracking substantially consists of C4 and C5 hydrocarbons. The absence of C6+ hydrocarbons in the C4 hydrocracking feed stream allows more C4/C5 to be converted to C2/C3. If non-aromatic C6+ hydrocarbons are present in the feed, they are more likely to be converted than C4/C5, which reduces the conversion of C4/C5.

Preferably, the amount of methane in the C4 hydrocracking product stream is at most 15 wt %, more preferably at most 10 wt %, even more preferably at most 7 wt %. Preferably, the amount of the C2-C3 hydrocarbons in the C4 hydrocracking product stream is at least 60 wt %, more preferably 70 wt %, even more preferably at least 80 wt %. Preferably, the amount of the C4+ hydrocarbons in the C4 hydrocracking product stream is at most 30 wt %, more preferably at most 20 wt % and even more preferably at most 15 wt %.

C4 hydrocracking is a catalytic hydrocracking process. The catalyst used preferably comprises zeolites of the mordenite (MOR)-type or of the erionite (ERI)-type.

The chemical composition of mordenite related to one cellular unit can be represented by the formula: $M(8/n)[(AlO_2)_8(SiO_2)_{40}] \cdot 24H_2O$ wherein M is a cation having a valence n. M is preferably sodium, potassium or calcium.

The chemical composition of erionite can be represented by the formula $(Na_2,K_2Ca)_2Al_4Si_{14}O_{36} \cdot 15H_2O$.

As in the case of all zeolites, erionite and mordenite are crystalline silico-aluminate constituted by $SiO_4$ and $AlO_4^-$ tetrahedron groups, the negative charge being compensated by an exchangeable cation. Erionite and mordenite occur in the natural state in the form of a salt of sodium, calcium and/or potassium. Preferably, erionite and mordenite are employed in their acid form by replacing the cation which is present by the hydrogen ion (to form hydrogenated erionite, H-erionite, or hydrogenated mordenite, H-mordenite) or a plurivalent cation. By way of example, this replacement can be achieved by ion exchange with the plurivalent cation or the ammonium ion for the hydrogen form, followed by drying and calcination of the zeolite. The plurivalent cations which endow the erionite or the mordenite with acidity and therefore hydrocracking activity can be the alkaline-earth cations such as beryllium, magnesium, calcium, strontium and barium or else the cations of the rare earths.

Erionite and mordenite can be employed in its hydrogen form by virtue of its higher activity, with a residual proportion of sodium of less than 1% by weight with respect to the dehydrated erionite or mordenite.

The erionite or mordenite can occur in two types, namely the large-pore type and the small pore type. By way of indication, the erionites and mordenites in the form of sodium are capable of sorbing hydrocarbons having a diameter of less than approximately 7 Å in the case of the large-pore type and approximately 5 Å in the case of the small pore type. If the erionite or mordenite is in its hydrogen form, the size of the sorbed molecules can increase to 8-9 Å in the case of the large pore types and 7 Å in the case of the small pore types.

It should be noted that erionite or mordenite are not completely characterized by the formula given above since it can be modified by selective dissolution of alumina by means of suitable solvents such as mineral acids.

Further, a dealuminated or desilicated erionite or mordenite can be employed for C4 hydrocracking. The dealumination or desilication treatment often confers better activity and especially higher stability on the catalyst in the hydrocracking processes. It can be considered that an erionite or mordenite is really dealuminated when the silicon/aluminum molar ratio is equal to or higher than 10. By way of indication, the dealumination treatment can be performed as follows: the erionite or mordenite is treated at the boiling point for a period of a few hours with a twice normal hydrochloric acid solution, whereupon the solid is filtered, washed and finally dried.

It is desirable to provide a catalyst having good mechanical or crush strength or attrition resistance, because in an industrial environment the catalyst is often subjected to rough handling, which ends to break down the catalyst into powder-like material. The latter causes problems in the processing. Preferably, the zeolite is therefore mixed with a matrix and a binder material and then spray-dried or shaped to the desired shape, such as pellets or extrudates. Examples of suitable binder materials include active and inactive materials and synthetic or naturally occurring zeolites as well as inorganic materials such as clays, silica, alumina, silica-alumina, titania, zirconia and zeolite. Silica and alumina are preferred because these may prevent unwanted side reactions. Preferably, the catalyst comprises, in addition to the zeolite, 2-90 wt %, preferably 10-85 wt % of a binder material.

In some embodiments, the catalyst consists of mordenite or erionite and an optional binder. In other embodiments, the catalyst further comprise one or more metals chosen from group VIB, VIIB and/or VIII of the Periodic Table of Elements. Preferably the catalyst comprises at least one group VIB and/or VIII metals, more preferably at least one group VIII metal.

One preferred catalyst comprises one or more group VIII metals, more preferably one or more VIII noble metals such as Pt, Pd, Rh and Ir, even more preferably Pt and/or Pd. The catalyst preferably comprises in the range of from 0.05 to 10 wt %, more preferably of from 0.1 to 5 wt %, even more preferably of from 0.1 to 3 wt % of such metals, based on the total weight of the catalyst.

Another preferred catalyst comprises at least one group VIB, VIIB and/or VIII metal in combination with one or more other metals, i.e. metals which are not from group VIB, VIIB or VIII. Examples of such combinations of a group VIB, VIIB and VIII in combination with another metal include, but are not limited to PtCu, PtSn or NiCu. The catalyst preferably comprises in the range of from 0.05 to 10 wt %, more preferably of from 0.1 to 5 wt %, even more preferably of from 0.1 to 3 wt % of such metals, based on the total weight of the catalyst.

Yet another preferred catalyst comprises a combination of a group VIB and a group VIII metal. Examples of such combinations of a group VIB and group VIII metal include, but are not limited to, CoMo, NiMo and NiW. The catalyst preferably comprises in the range of from 0.1 to 30 wt %, more preferably of from 0.5 to 26 wt %, based on the total weight of the catalyst.

In the C4 hydrocracking process the hydrocarbon feed stream is contacted with the catalyst at elevated temperatures and elevated pressures. Preferably, the feed stream is contacted with the catalyst at a temperature in the range of 200-650° C., more preferably 250-550° C., most preferably 325-450° C. or 397-510° C. The temperature that is chosen will depend on the composition of the feed stream and the desired product. Preferably, the feed stream is contacted with the catalyst at a pressure of 0.3-10 MPa, more preferably 0.5-6 MPa, most preferably 2-3 MPa.

Preferably, the feed stream is contacted with the catalyst at a weight hourly space velocity (WHSV) of 0.1 to 20 $hr^{-1}$, more preferably 0.5 to 10 $hr^{-1}$. For the C4 hydrocracking the rate of injection is represented by the spatial velocity of introduction of the hydrocarbon charge in liquid form: VVH is the hourly volume rate of flow of charge per volume of catalyst. The value of VVH ranges preferably from 0.1 to 10 $h^{-1}$ and more preferably 0.5 to 5 $h^{-1}$.

The C4 hydrocracking is carried out in the presence of hydrogen. The partial hydrogen pressure in the reaction zone is preferably high; that is within the range of 0.5 to 10 MPa. The partial hydrogen pressure is usually within the range of 2 to 8 MPa and preferably between 2 and 4 MPa.

Hydrogen may be provided in any suitable ratio to the hydrocarbon feed. Preferably, the hydrogen is provided in a molar ratio hydrogen to the hydrocarbon feed of 1:1 to 100:1, more preferably 1:1 to 50:1, more preferably 1:1 to 20:1, most preferably 2:1 to 8:1, wherein the number of moles of the hydrocarbon feed is based on the average molecular weight of the hydrocarbon feed.

A further particularly preferred example of the C4 hydrocracking catalyst comprises sulfided-nickel/H-Erionite1. Heck and Chen (1992), Hydrocracking of n-butane and n-heptane over a sulfide nickel erionite catalyst. Applied Catalysis A: General 86, P83-99, describes such catalyst. The C4 hydrocracking may be performed at conditions comprising a temperature of 397-510° C. and a pressure of 2-3 MPa.

In one embodiment the C4 hydrocracking catalyst consists of a hydrogenated mordenite with a residual proportion of sodium of less than 1% by weight with respect to the dehydrated mordenite, and an optional binder or comprises sulfided-nickel/H-Erionite1 and the C4 hydrocracking is performed under conditions comprising a temperature between 325 and 450° C., a partial hydrogen pressure between 2 and 4 MPa, a molar ratio hydrogen to hydrocarbon feed of 2:1 to 8:1, wherein the number of moles of the hydrocarbon feed is based on the average molecular weight of the hydrocarbon feed and a VVH of 0.5 to 5 $h^{-1}$.

PREFERRED EMBODIMENTS

In some particularly preferred embodiments,
the separation between the light hydrocarbon stream and the middle hydrocarbon stream is performed to separate between C3 and iC4;

the separation between the middle hydrocarbon stream and the heavy hydrocarbon stream is performed to separate C5 and C6;
step b) involves separating between the C4 of the middle hydrocarbon stream and the C5 of the middle hydrocarbon stream;
at least part of the C5 in the middle hydrocarbon stream is recycled back to the first hydrocracking in step a);
part of the C4 in the middle hydrocarbon stream is subjected to the C4 hydrocracking and the C4 hydrocracking product stream is recycled back to the separation of step b) and
part of the C4 in the middle hydrocarbon stream is subjected to a further step selected from the group consisting of isomerization, butane dehydrogenation (non-oxidative and oxidative), reaction with methanol and reaction with ethanol and combinations thereof.

In some particularly preferred embodiments,
the separation between the light hydrocarbon stream and the middle hydrocarbon stream is performed to separate between iC4 and nC4;
the separation between the middle hydrocarbon stream and the heavy hydrocarbon stream is performed to separate C5 and C6;
step b) involves separating between the nC4 of the middle hydrocarbon stream and the C5 of the middle hydrocarbon stream;
at least part of the C5 in the middle hydrocarbon stream is recycled back to the first hydrocracking in step a);
part of the nC4 in the middle hydrocarbon stream is subjected to the C4 hydrocracking and the C4 hydrocracking product stream is recycled back to the separation of step b) and
part of the nC4 in the middle hydrocarbon stream is subjected to a further step selected from the group consisting of isomerization, butane dehydrogenation (non-oxidative and oxidative),
reaction with methanol and reaction with ethanol and combinations thereof.

Figure 2:
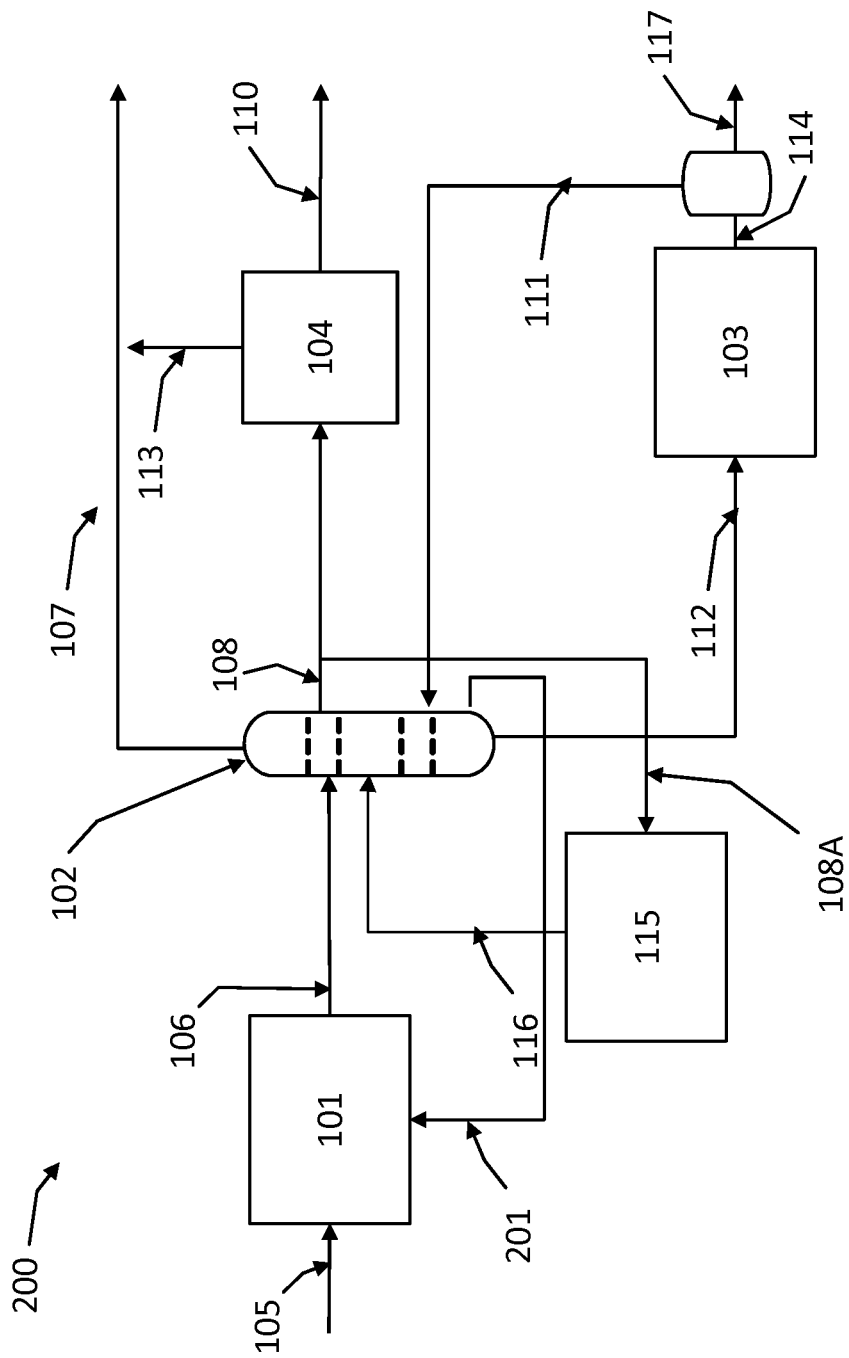
Figure 3:
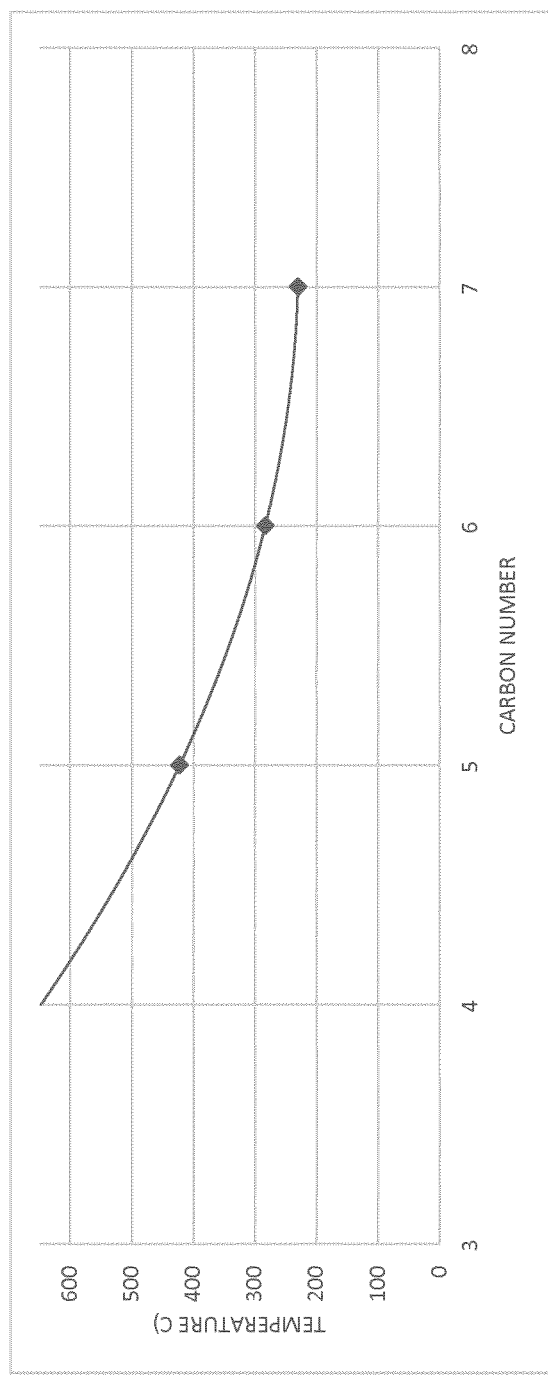

FIG. 1 is an illustration of an embodiment of the system.
FIG. 2 is an illustration of an embodiment of the system.
FIG. 3 is a graphical illustration of estimated reaction temperatures.

System

In a further aspect, the present invention also relates to a process installation suitable for performing the process of the invention, an example of which is illustrated in FIG. 1. The present invention therefore relates to a system for producing LPG and BTX, comprising
a first hydrocracking unit (101) arranged for performing first hydrocracking of a mixed hydrocarbon feed stream (105) in the presence of a first hydrocracking catalyst to produce a first hydrocracking product stream (106);
a separation unit (102) for separating the first hydrocracking product stream (106) arranged to provide at least a light hydrocarbon stream (107) comprising at least C2 and C3, a middle hydrocarbon stream (108) comprising C4 and/or C5 and a heavy hydrocarbon stream (112) comprising at least C6+ and
a second hydrocracking unit (103) arranged for performing second hydrocracking of the heavy hydrocarbon stream (112) in the presence of a second hydrocracking catalyst to produce a second hydrocracking product stream (114) comprising BTX, wherein
the system (100) is arranged for feeding at least part of the middle hydrocarbon stream (108) to a C4 hydrocracking unit (115) arranged for performing C4 hydrocracking optimized for converting C4 hydrocarbons into C3 hydrocarbons in the presence of a C4 hydrocracking catalyst to produce a C4 hydrocracking product stream (116)

Preferably, the system (100) is arranged for recycling back the C4 hydrocracking product stream (116) to the separation unit (102).

The separation unit (102) may use any known technology for the separation of a mixed hydrocarbon stream, for example, gas-liquid separation, distillation or solvent extraction. The separation unit (102) may be one fractionating column having outlets for different hydrocarbon streams or a combination of multiple fractionating columns. For example, the separation unit (102) may comprise a fractionating column having respective outlets for the light hydrocarbon stream (107), the middle hydrocarbon stream (108) and the heavy hydrocarbon stream (112). In some embodiments, the separation unit (102) comprises a further column connected to the outlet for the middle hydrocarbon stream (108), the further column having respective outlets for a first middle hydrocarbon stream and a second middle hydrocarbon stream having a higher boiling point range than the boiling point range of the first middle hydrocarbon stream.

In other embodiments, the separation unit (102) comprises a column having respective outlets for the light hydrocarbon stream (107), a first middle hydrocarbon stream (108), a second middle hydrocarbon stream (108) having a higher boiling point range than the boiling point range of the first middle hydrocarbon stream and a heavy hydrocarbon stream (112).

In other embodiments, the separation unit (102) comprises a first column having an outlet for the light hydrocarbon stream (107) and an outlet for the remainder; and a second column having an inlet connected to the outlet for the remainder of the first column, an outlet for the middle hydrocarbon stream (108) and an outlet for the heavy hydrocarbon stream (112).

The system according to the invention may further comprise a C4 processing unit (104) arranged for processing the part of the middle hydrocarbon stream which is not fed to the C4 hydrocracking unit (115). The C4 processing unit (104) may be formed of one or more processing units. For example, the C4 processing unit (104) may be a unit for processing C4 hydrocarbon by isomerization, butane dehydrogenation (non-oxidative and oxidative) or reaction with methanol and reaction with ethanol. The C4 processing unit may also be a combination of units, e.g. a unit for isomerization followed by a unit for reaction with methanol or a unit for reaction with ethanol.

FIG. 1 is hereinafter described in detail. FIG. 1 schematically illustrates a system 100 comprising a first hydrocracking unit 101, a separation unit 102, a second hydrocracking unit 103, a C4 hydrocracking unit 115 and a C4 processing unit 104.

As shown in FIG. 1, a mixed hydrocarbon feed stream 105 is fed to the first hydrocracking unit 101 which produces a first hydrocracking product stream 106. The first hydrocracking product stream 106 is fed to the separation unit 102, which produces a light hydrocarbon stream 107, a middle hydrocarbon stream 108 and a heavy hydrocarbon stream 112.

In this embodiment, the separation between the light hydrocarbon stream 107 and the middle hydrocarbon stream 108 is performed to separate between C3 and iC4 and the separation between the middle hydrocarbon stream 108 and the heavy hydrocarbon stream 112 is performed to separate nC4 and C5. In this case, the light hydrocarbon stream 107 consists of C3−, the middle hydrocarbon stream 108 consists of C4 (iC4 and nC4) and the heavy hydrocarbon stream 112 consists of C5+.

The light hydrocarbon stream 107 of C3− is obtained as a final product or subjected to suitable further steps (not shown).

The heavy hydrocarbon stream 112 of C5+ is subjected to the second hydrocracking unit 103, which produces a second hydrocracking product stream 114 comprising BTX.

A part of the middle hydrocarbon stream 108 (iC4 and nC4) is fed to the C4 processing unit 104, which produces desired hydrocarbons. A C3-stream 113 obtained from the C4 processing unit 104 is mixed with the light hydrocarbon stream 107 from the separation unit 102. A C4 stream 110 from the C4 processing unit 104 is obtained as a final product or subjected to suitable further steps (not shown).

A part 108A of the middle hydrocarbon stream 108 (iC4 and nC4) is recycled back to the C4 hydrocracking unit 115 which produces a C4 hydrocracking product stream 116 rich in C2 and C3. The C4 hydrocracking product 116 fed to the separation unit 102. Due to the recycling of part 108A of the middle hydrocarbon stream 108 from the separation unit 102 to the C4 hydrocracking unit 115, the amount of C2-C3 in the light hydrocarbon stream 107 is increased.

In FIG. 1, the separation of the middle hydrocarbon stream is drawn at a location outside of the separation unit 102. It will be appreciated that this separation can be done in the separation unit 102, i.e. the middle hydrocarbon stream 108 may be provided in the form of two already separated streams.

FIG. 2 illustrates a further embodiment 200 of the system of the invention. FIG. 2 is identical to FIG. 1 except that the separation unit 102 produces a light stream 107 comprising C3−; a first middle stream 108 comprising C4; a second middle stream 201 comprising C5 and a heavy stream 112 comprising C6+. A part of the first middle stream is fed to the C4 hydrocracking unit 115 while a part 108A of the first middle stream is fed to the C4 processing unit 104. The second middle stream 201 is recycled back to the first hydrocracking unit 101. A further difference in FIG. 2 with respect to FIG. 1 is that the second hydrocracking unit 103 produces a second hydrocracking product stream 114 which is separated into a stream 117 comprising BTX and a stream 111 comprising C4-which is recycled back to the separation unit 102.

EXAMPLES

Example 1

A feed consisting of n-pentane was subjected to hydrocracking in order to determine the influence of hydrocracking conditions to the product compositions. The experiments were carried out in a 12 mm reactor, wherein the catalyst bed was located in the isothermal zone of the reactor heater. The catalyst used was a mixture of 2 grams of Pt on alumina (Pt-loading of 0.75 wt %) and H-ZSM-5 ($SiO_2/Al_2O_3$=80).

The feed stream was fed to the reactor. The feed stream enters a vaporizer section prior to the reactor where it is vaporized at 280° C. and mixed with hydrogen gas. The conditions used throughout these experiments were: WHSV=1/hr, pressure was 1379 kPa (200 psig) and the molar ratio H2/hydrocarbons was 3. The temperature of the isothermal zone of the reactor was varied between 375 and 450° C. The effluent of the reactor was sampled in the gas phase to an online gas chromatograph. Product analyses were carried out once per hour.

TABLE 1

| Compositions of hydrocracking product effluent | | | | |
|---|---|---|---|---|
| Component | 375° C. | 400° C. | 425° C. | 450° C. |
| Methane (wt %) | 0.5 | 1.1 | 2.2 | 3.9 |
| Ethane (wt %) | 3.3 | 7.2 | 12.7 | 19.4 |
| Propane (wt %) | 16.3 | 24.4 | 32.8 | 39.7 |
| Butanes (wt %) | 16.9 | 19.8 | 20.8 | 19.0 |
| i-Pentane (wt %) | 11.9 | 13.8 | 13.4 | 9.6 |
| n-Pentane (wt %) | 49.0 | 32.3 | 17.3 | 7.2 |
| C6+ (wt %) | 2.1 | 1.4 | 0.8 | 1.2 |
| Selectivity (—) | 98.7 | 98 | 96.8 | 95.3 |

The compositions of the product effluent at different reactor temperatures are provided in Table 1. The selectivity was defined as (100%−(amount of methane formed/amount of C5 converted)). The amount of C5 converted is defined as (total amount−(i-pentane and n-pentane)). By comparing the results in Table 1, it was observed that when the reactor temperature is decreased, the overall selectivity is increased during hydrocracking. It is anticipated that a similar trend will be observed when a feed consisting of butanes is subjected to hydrocracking (based on experiments using different carbon number paraffin feeds and conversions and production rates obtained using naphtha type feeds).

It can therefore be concluded that a higher selectivity can be achieved by operating at a lower temperature.

Example 2

A feed consisting of a normal paraffin was subjected to hydrocracking in order to determine the influence of hydrocarbon chain length to the extent of conversion. The experiments were carried out in a 12 mm reactor, wherein the catalyst bed was located in the isothermal zone of the reactor heater. The catalyst used was a mixture of 2 grams of Pt on alumina (Pt-loading of 0.75 wt %) and H-ZSM-5 ($SiO_2/Al_2O_3$=80).

The feed stream was fed to the reactor. The feed stream enters a vaporizer section prior to the reactor where it is vaporized at 280° C. and mixed with hydrogen gas. The conditions used throughout these experiments were: WHSV=1/hr, pressure was 1379 kPa (200 psig) and the molar ratio H2/hydrocarbons was 3. The temperature of the isothermal zone of the reactor was varied between 300 and 500° C. The effluent of the reactor was sampled in the gas phase to an online gas chromatograph. Product analyses were carried out once per hour.

TABLE 2

| Single-pass conversion of normal paraffins | | | | | | | |
|---|---|---|---|---|---|---|---|
| Feed component | 300° C. | 350° C. | 375° C. | 400° C. | 425° C. | 450° C. | 500° C. |
| n-Pentane |  |  | 51.03 | 67.74 | 82.70 | 92.82 |  |
| n-Hexane |  | 92.76 | 96.35 | 98.20 | 98.96 | 99.67 |  |

TABLE 2-continued

| | Single-pass conversion of normal paraffins | | | | | | |
|---|---|---|---|---|---|---|---|
| Feed component | 300° C. | 350° C. | 375° C. | 400° C. | 425° C. | 450° C. | 500° C. |
| n-Heptane | 92.76 | 99.10 | 99.51 | 99.73 | 99.90 | 99.98 | 100 |
| n-Octane | | 99.89 | | | | | 100 |

The conversion level at different reactor temperatures is provided in Table 2. The conversion level was defined as ((n-paraffin effluent concentration in wt %−100)/100). By comparing the results in Table 2, it was observed that when the chain length of the normal paraffin is reduced, the extent of conversion is reduced at a similar temperature. Alternatively, increased reaction temperatures are required to achieve sufficient conversion levels for normal paraffins with shorter chain length. By interpolation of the data presented in Table 2, the temperature required to achieve 80% conversion could be estimated for n-pentane, n-hexane and n-octane. The estimated reaction temperatures are depicted in FIG. 3. Extrapolation of the data confirms that significantly higher reaction temperatures are required to achieve sufficient conversion of n-butane.

As illustrated by Example 1, the feed components that are to be exposed to these higher temperatures should be minimized to achieve high selectivities. This could be achieved by sending the butanes and pentanes to a dedicated hydrocracker optimized for converting C4 to C3 instead of subjecting them to second hydrocracking having severe conditions.

The invention claimed is:

1. A process for producing LPG and BTX, comprising
a) subjecting a mixed hydrocarbon stream to first hydrocracking in the presence of a first hydrocracking catalyst to produce a first hydrocracking product stream;
b) separating the first hydrocracking product stream to provide at least
a light hydrocarbon stream comprising at least C2 and C3 hydrocarbons,
a middle hydrocarbon stream consisting of C4 and/or C5 hydrocarbons and
a heavy hydrocarbon stream comprising at least C6+ hydrocarbons and
c) subjecting the heavy hydrocarbon stream to second hydrocracking in the presence of a second hydrocracking catalyst to produce a second hydrocracking product stream comprising BTX, wherein the second hydrocracking is more severe than the first hydrocracking,
wherein at least part of the middle hydrocarbon stream is subjected to C4 hydrocracking optimized for converting C4 hydrocarbons into C3 hydrocarbons in the presence of a C4 hydrocracking catalyst to produce a C4 hydrocracking product stream.

2. The process according to claim 1, wherein the C4 hydrocracking catalyst comprises a mordenite or an erionite.

3. The process according to claim 1, wherein the C4 hydrocracking catalyst consists of a mordenite and an optional binder or comprises sulfided-nickel/H-Erionite1 and the C4 hydrocracking is performed under conditions comprising a temperature between 325 and 450° C., a partial hydrogen pressure between 2 and 4 MPa, a molar ratio hydrogen to hydrocarbon feed of 2:1 to 8:1, wherein the number of moles of the hydrocarbon feed is based on the average molecular weight of the hydrocarbon feed and a VVH of 0.5 to 5 h$^{-1}$.

4. The process according to claim 1, wherein the second hydrocracking product stream is substantially free from non-aromatic C6+ hydrocarbons.

5. The process according to claim 1, wherein the second hydrocracking is performed using a hydrocracking catalyst comprising 0.01-1 wt-% hydrogenation metal in relation to the total catalyst weight and a zeolite having a pore size of 5-8 Å and a silica (SiO2) to alumina (Al2O3) molar ratio of 5-200 under conditions comprising a temperature of 300-580° C., a pressure of 0.3-5 MPa gauge and a Weight Hourly Space Velocity (WHSV) of 0.1-15 h$^{-1}$.

6. The process according to claim 1, wherein the C4 hydrocracking product stream is recycled back to the separation of step b).

7. The process according to claim 1, wherein step b) involves separating between the C4 hydrocarbons of the middle hydrocarbon stream and the C5 hydrocarbons of the middle hydrocarbon stream and wherein the C4 hydrocarbons of the middle hydrocarbon stream is subjected to the C4 hydrocracking and the C5 hydrocarbons of the middle hydrocarbon stream is recycled back to the first hydrocracking in step a).

8. The process according to claim 1, wherein the mixed hydrocarbon feedstream comprises a naphtha or a naphtha-like product.

9. The process according to claim 1, wherein H2 or H2 and C1 hydrocarbon is separated from the first hydrocracking product stream before the separation between the light, middle and heavy hydrocarbon streams.

10. The process according to claim 1, wherein the separation between the light hydrocarbon stream and the middle hydrocarbon stream is performed to separate between C3 hydrocarbon and iC4 hydrocarbon, between iC4 hydrocarbon and nC4 hydrocarbon or between nC4 hydrocarbon and C5 hydrocarbon.

11. The process according to claim 1, wherein the separation between the middle hydrocarbon stream and the heavy hydrocarbon stream is performed to separate between nC4 hydrocarbon and C5 hydrocarbon or between C5 hydrocarbon and C6 hydrocarbon.

12. The process according to claim 1, wherein at least part of non-recycled C4 hydrocarbon from the middle hydrocarbon stream is subjected to a further step selected from the group consisting of isomerization, butane dehydrogenation (non-oxidative and oxidative), reaction with methanol and reaction with ethanol and combinations thereof.

13. The process according to claim 1, wherein C4−hydrocarbon in the second hydrocracking product stream is separated from the second hydrocracking product stream to be recycled back to the separation of step b) or combined with the light hydrocarbon stream.

14. The process according to claim 1, wherein the amount of methane in the first hydrocracking product stream is at most 5 wt %.

15. The process according to claim 1, wherein the amount of the C4 and C5 hydrocarbons in the at least part of the middle hydrocarbon stream is at least 70 wt % and the amount of the C2-C3 hydrocarbons in the C4 hydrocracking product stream is at least 60 wt %.

16. The process according to claim 5, wherein the temperature is 425-580° C.

17. The process according to claim 8, wherein the mixed hydrocarbon feedstream has a boiling point range of 20-200° C.

* * * * *